US012710871B2

(12) United States Patent
Kachare

(10) Patent No.: US 12,710,871 B2
(45) Date of Patent: Aug. 18, 2026

(54) METHODS AND DEVICES FOR FILE READ LATENCY REDUCTION

(71) Applicant: Samsung Electronics Co., Ltd., Gyeonggi-do (KR)

(72) Inventor: Ramdas P. Kachare, Pleasanton, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/504,006

(22) Filed: Oct. 18, 2021

(65) Prior Publication Data

US 2023/0024420 A1 Jan. 26, 2023

Related U.S. Application Data

(60) Provisional application No. 63/222,694, filed on Jul. 16, 2021.

(51) Int. Cl.
*G06F 3/06* (2006.01)

(52) U.S. Cl.
CPC .......... *G06F 3/0611* (2013.01); *G06F 3/0655* (2013.01); *G06F 3/0679* (2013.01)

(58) Field of Classification Search
None
See application file for complete search history.

(56) References Cited

U.S. PATENT DOCUMENTS 5,930,815 A 7/1999 Estakhri et al.
6,128,695 A 10/2000 Estakhri et al.
7,953,919 B2 5/2011 Allen et al.
8,010,740 B2 8/2011 Arcedera et al.
8,140,739 B2 3/2012 Langlois et al.
9,323,659 B2 4/2016 Shats et al.
9,378,135 B2 6/2016 Bennett
9,626,288 B2 4/2017 Danilak et al.
9,678,966 B2 * 6/2017 Ki .......................... G06F 3/0638
9,720,596 B1 * 8/2017 Bono ...................... G06F 3/064
9,778,975 B2 10/2017 Wallace et al.
9,858,008 B2 1/2018 Liu et al.
9,927,998 B2 3/2018 Lee et al.
(Continued)

FOREIGN PATENT DOCUMENTS

TW 202036300 10/2020

OTHER PUBLICATIONS

Ni, Fan et al., "Leveraging SSD's Flexible Address Mapping to Accelerate Data Copy Operations", 2019 IEEE 21st International Conference on High Performance Computing and . . . Communications; IEEE 17th International Conference on Smart City; IEEE 5th International Conference on Data Science and Systems (HPCC/SmartCity/DSS), 2019, pp. 1051-1059.
(Continued)

*Primary Examiner* — Stephanie Wu
(74) *Attorney, Agent, or Firm* — The Farrell Law Firm, P.C.

(57) ABSTRACT

Methods and devices are provided in which a controller of a storage device receives a read command including at least a file pointer of a file, from an application at a host device. The controller retrieves a physical block address (PBA) list associated with file data from a table maintained at the controller using the file pointer. The controller reads data from a memory using the PBA list, and provides the file data to the application at the host device.

18 Claims, 6 Drawing Sheets

(56) References Cited

U.S. PATENT DOCUMENTS

| | | | | |
|---|---|---|---|---|
| 10,061,523 | B2 | 8/2018 | Rezaei et al. | |
| 10,261,705 | B2 | 4/2019 | Li | |
| 10,545,862 | B2 | 1/2020 | Kanno et al. | |
| 2006/0184720 | A1 | 8/2006 | Sinclair et al. | |
| 2008/0307192 | A1* | 12/2008 | Sinclair | G06F 12/0246 711/218 |
| 2009/0164696 | A1* | 6/2009 | Allen | G06F 12/0246 711/E12.078 |
| 2010/0250880 | A1* | 9/2010 | Mimatsu | G06F 11/1451 711/170 |
| 2013/0159304 | A1* | 6/2013 | Halpern, III | G06F 12/16 707/E17.044 |
| 2017/0060744 | A1* | 3/2017 | Saitou | G06F 3/0647 |
| 2019/0250841 | A1 | 8/2019 | Li | |
| 2020/0218465 | A1* | 7/2020 | Klein | G06F 3/0604 |
| 2021/0165604 | A1 | 6/2021 | Kim et al. | |
| 2022/0171532 | A1* | 6/2022 | Kang | G06F 3/064 |
| 2022/0229789 | A1* | 7/2022 | Balakrishnan | G06F 13/4282 |

OTHER PUBLICATIONS

European Search Report dated Dec. 14, 2022 issued in counterpart application No. 22185183.5-1224, 8 pages.
European Search Report dated Dec. 7, 2023 issued in counterpart application No. 22185183.5-1224, 7 pages.
EP Communication Report dated Sep. 27, 2024 issued in counterpart application No. 22185183.5-1218, 6 pages.
Taiwanese Office Action dated Nov. 12, 2025 issued in counterpart application No. 111126577, 9 pages.
Korean Office Action dated Mar. 3, 2026 issued in counterpart application No. 10-2022-0086562, 6 pages.

* cited by examiner

METHODS AND DEVICES FOR FILE READ LATENCY REDUCTION

PRIORITY

This application is based on and claims priority under 35 U.S.C. § 119(e) to U.S. Provisional Patent Application Ser. No. 63/222,694, filed on Jul. 16, 2021, the entire contents of which are incorporated herein by reference.

TECHNICAL AREA

The present disclosure relates generally to storage devices that storage file data, and more particularly, to methods and devices that read stored data with reduced latency.

BACKGROUND

Files are a type of data structure that are used by applications to manage user data. As such, efficient processing, storage, security, and general management of the data is important to information technology (IT) systems. Applications use and depend upon file systems, operating systems (OSs), and other such system software for file management and access related operations.

Solid state drives (SSDs) are components of persistent data storage for modern IT infrastructure, as vast amounts of data are being generated by various applications, such as, for example, Internet of things (IOT), social networks, autonomous vehicles, etc. NAND flash media based SSD storage devices are also components of the IT infrastructure.

When applications require data, the desired data portions of stored files are fetched from an SSD storage device. Since SSDs provide high performance persistent storage, some system performance bottlenecks have shifted towards system software layers. File read latency of such operations is an important factor in the performance and end-user experience of applications (e.g., gaming and online shopping applications).

SUMMARY

According to an embodiment, a method of a storage device is provided. A controller of the storage device receives a read command including at least a file pointer of a file, from an application at a host device. The controller retrieves a physical block address (PBA) list associated with file data from a table maintained at the controller using the file pointer. The controller reads data from a memory using the PBA list, and provides the file data to the application at the host device.

According to an embodiment, a storage device is provided that includes a controller and a storage medium. The controller is configured to receive, from an application at a host device, a read command comprising at least a file pointer of a file. The controller is also configured to retrieve a PBA list associated with file data from a table maintained at the controller using the file pointer. The controller is further configured to read data from the storage medium using the PBA list, and provide the file data to the application at the host device.

According to an embodiment, a method of a host device is provided. An application at the host device sends a read command comprising at least a file pointer of a file comprising file data for the application, to a controller of a storage device. The application receives, from the controller, the file data retrieved by the controller using a table maintained at the controller that associates file pointers with PBA lists for files.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
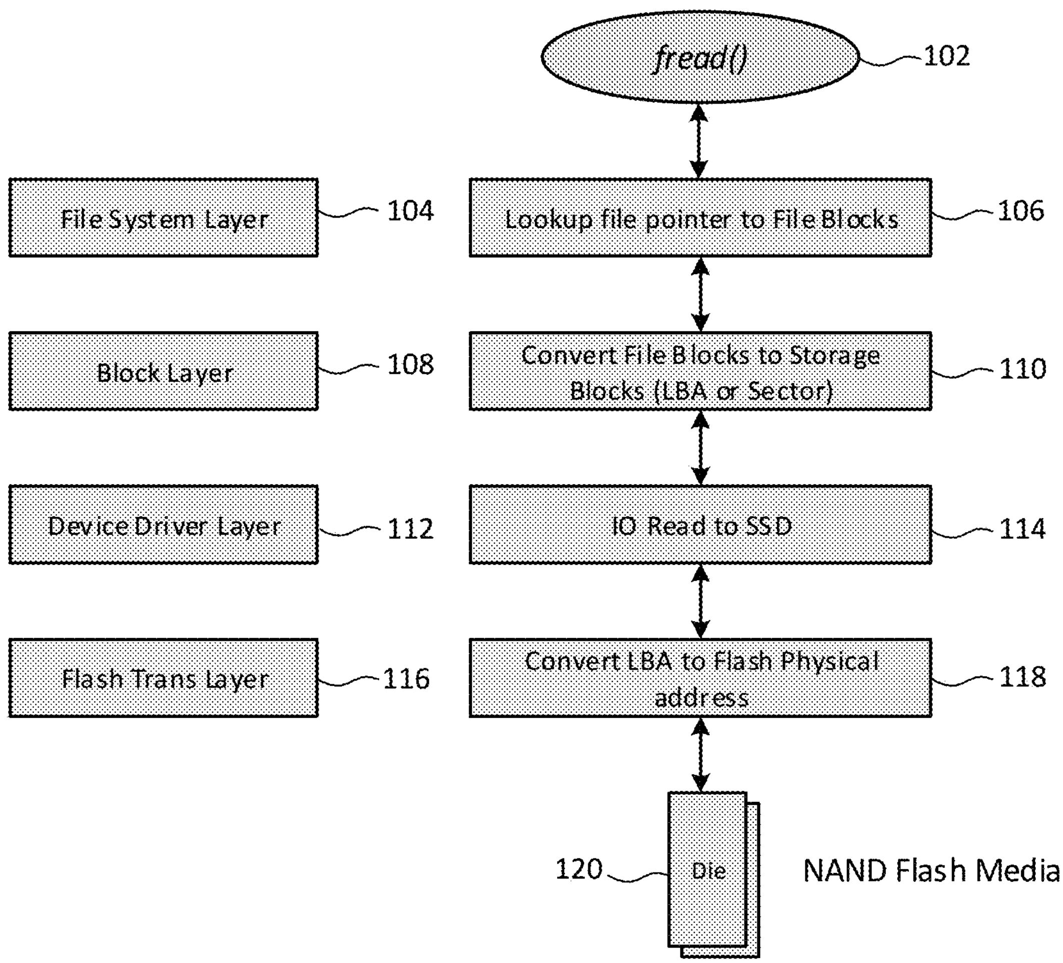
FIG. 1 is a flowchart illustrating a file read operation, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices utilizing storage devices and/or non-volatile memory express (NVMe). The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

File data structures are used by applications to organize and manage user data. Applications process large and varied amount of user data as part of their execution. Applications may generate new data and/or access data generated by other applications. Applications often process data and transform that data to generate new data items. The end user experience of the applications often depends upon efficient data processing and sharing.

At a basic level, a file name can denote a block of unique user data. The user data may have unique and different formats, organization, layouts, and meanings. The applications that process that data may understand the semantics of such data. However, beyond the semantics, such data must be preserved persistently in storage media. Also, such data can be protected against various physical degrading effects, can be made available to the applications when needed, can be protected for security and privacy, and, at times, can be shared with other data processing processes. These aspects of data management can be agnostic to the semantics of the data.

Files are data structures to manage these data semantics agnostic aspects of the user data, and user applications depend upon other system software layers such as file systems to manage those aspects. File system themselves use services and the assistance of many other software and hardware components to achieve the desired data management functions. Some examples of such software components are operating systems (OSs), application programming interface (API) libraries, and various drivers. Some examples of hardware components are storage devices, redundant array of independent disks (RAID) controllers, network interface cards, etc.

Applications may use file system APIs to create files, store data into those files, and read data from the files for processing. File systems implement APIs that can be used by the applications to perform above functions. File systems and the software and hardware components implemented for this purpose are extremely complex.

For example, relatively complex algorithms can be used to achieve desired data management functions. Such complexity may result in longer execution times of data read and write operations for the applications. The data read operation latency may be a relevant factor for the applications. Longer data read times may manifest as sluggish user experiences or as user interface freeze or perceived hangs. Hence, it may be desirable to reduce and optimize data read latencies.

For example, a longer latency to update game scenes could make a gaming experience less enjoyable to a gamer, and the gamer may lose interest in that gaming system. Similarly, sluggish online shopping systems may result in the loss of valuable potential customers.

In accordance with an aspect of the disclosure, a system and method are provided to improve file read latency by avoiding traversal of some of the system software layers and performing some of the look-up functions in advance. That is, an application may send file read requests directly to a storage device instead of going through the file system. By sending the file read requests directly to the storage device, some overhead in the system software stack is bypassed. Specifically, the file pointer to logical block address (LBA) look-up steps are bypassed in the system software and are performed efficiently in the attached storage device.

To achieve such an efficient file read operation, some file system functions may be modified to monitor and mirror the file pointer to LBA mapping table to the SSD Controller. The SSD controller architecture may be optimized to maintain and use an OFT to keep file pointer, LBA, and PBA mappings. The SSD Controller accepts direct file read requests and then obtains PBAs from the OFT. The file read calls issued by the applications may be directly sent to the SSD Controller using a storage protocol such as NVMe or similar protocols. After the desired PBAs are identified, the SSD controller directly deposits user data into the application buffers, thereby significantly improving file data read latency.

The OFT may include at least one of a file pointer column, an LBA list column, a PBA list column, and a file read offset column. The file data may be provided to the application using the file read offset column. The file read calls may include an amount of data to be read from the memory and a file read offset, and the file read offset column may be updated using the file read offset of the file read calls. An updated file pointer-LBA list mapping for an entry of the OFT may be received from the host device, and the entry of the OFT may be updated with PBA list information retrieved based on the mapping.

While an LBA-based system architecture is described herein, the embodiments are not limited thereto and are equally applicable to key/value or other object based storage system architectures.

According to an embodiment, a system and method are provided, in which the file read operation is intercepted and directly sent to an SSD controller, instead of going through the file system, in order to improve latency. An example of file read operation by an application is shown below in Table 1.

TABLE 1

```
#include <stdio.h>
int main ( ) {
file *fp1; // file pointer
char * data_buffer; // buffer to store the data read from the SSD
int data_size; // size of the data structure or record
int num_data; // number of records to fetch from SSD
file_handle = fopen (file_name.txt, "r"); // open a file to read the data for
processing
data_size = 64;
num_data = 1000;
data_buffer = malloc (data_size * num_data); // allocate host memory
buffer to store the data
fread (file_handle, data_buffer, data_size, num_data); // file read
request to File System
process_data(data_buffer); // data processing
fclose(file_handle); // close the file
}
```

FIG. 1 is a flowchart illustrating a file read operation. When an fread( ) function call 102 is executed, the file pointer (file handle or file descriptor) is used by a file system layer 104 to look-up file system blocks associated with that file, at 106. At a storage block layer 108, the file system blocks are converted to corresponding storage blocks or sectors, referred to as LBAs, at 110. The storage block layer 108 and a storage device driver layer 112 send a storage input/output (I/O) read command to the SSD, at 114. In an SSD controller (flash translation layer 116), the LBAs are converted into NAND flash media PBAs, at 118. The user data is read from NAND flash media 120 and returned to the application.

As shown in FIG. 1, a file read operation traverses multiple system software layers to fetch the user data. These translations and traversals through the system software layers add latency.

According to an embodiment, some of the translation steps described above may be performed in advance, to avoid latency.

An SSD controller maintains Table 2 in the SSD device. The file pointer and LBA list columns are updated by new file system function calls described in detail below. The PBA list column is initialized and maintained by the SSD controller. The file read offset column may be updated by the host and the SSD controller.

TABLE 2

| Host Initialized | | SSD Controller Updated | |
|---|---|---|---|
| File Pointer | LBA List | PBA List (Channel/Die/Plane/ Block/Page/Offset) | File Read Offset (Byte) |
| 1234 | 100, 101, 102 | 4/2/1/23/37/128 | 0 |
| AB7689 | 73 | 3/1/1/93/293/4096 | 128 |
| 9CD84 | 835, 567 | 3/2/3/1 | 56 |

According to an embodiment, a set of new file operation function calls includes:

fopen_OFT( )
fread_OFT( )
fwrite_OFT( ), fsync_OFT( ), fflush_OFT( )
fclose_OFT( )
fseek_OFT( )

Other file system APIs can also be modified in similar fashion to assist with the proposed mechanism. The SSD controller architecture is optimized to create, update, maintain, and use the OFT to return user data in an expedited manner.

The application code example of Table 1 is shown in Table 3 below using the new file operation function calls.

TABLE 3

```
#include <stdio.h>
int main ( ) {
file *fp; // file pointer
char * data_buffer; // buffer to store the data read from the SSD
int data_size; // size of the data structure or record
int num_data; // number of records to fetch from SSD
file_handle = fopen_OFT (file_name.txt, "r"); // program file pointer
and associated LBAs in
the device
data_size = 64;
num_data = 1000;
data_buffer = malloc (data_size * num_data); // allocate host memory
buffer to store the data
fread_OFT (file_handle, data_buffer, data_size, num_data); // file read
request to SSD
Controller
process_data(data_buffer); // data processing
fclose_OFT(file_handle); // close the file, reset the file offset if necessary
}
```

Figure 2:
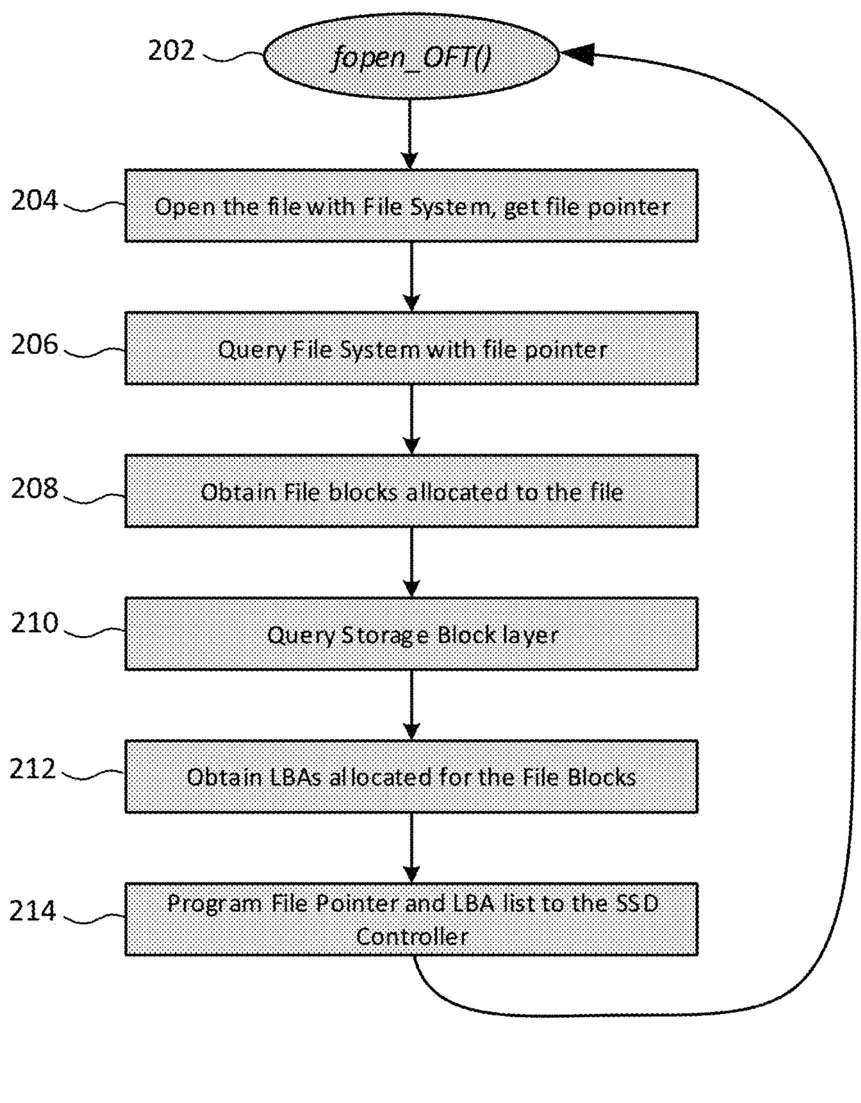
FIG. 2 is a flowchart illustrating an fopen_OFT( ) call at a host device, according to an embodiment.

FIG. 2 is a flowchart illustrating an fopen_OFT( ) call at a host device, according to an embodiment. Any components or any combination of the components described in FIGS. 6 and 7 can be used to perform one or more of the operations in the flowchart. The operations are exemplary and may involve various additional steps that are not explicitly described. The temporal order of the operations may be varied.

An fopen_OFT( ) function call 202 of Table 3 is used by an application in place of an fopen( ) function call of Table 1. This function call internally opens a specified file with the file system to obtain a file pointer, at 204. The function call queries the file system with the file pointer using file system software, at 206, and obtains associated file system blocks, at 208. The function call then queries the storage block layer with the file system block using storage block layer system software, at 210, and obtains an associated LBA mapping for the file system blocks, at 212. Once the LBA mapping for the file is obtained, the fopen_OFT( ) function call programs the file pointer and LBA mappings in the associated SSD controller, at 214. This programming may be achieved through SSD driver software, such as, for example, an NVMe device driver, and may use vendor defined NVMe commands. After the mappings are provided to the SSD controller, the function call returns.

It may also be possible to use fopen_OFT( ) to initialize an offset column value to zero (or another value).

As described above, the fopen_OFT( ) function call passes the file pointer and LBA mappings to the SSD controller. The SSD controller may receive this information in the form of vendor defined NVMe commands. The SSD controller allocates a free entry in the OFT and records the file pointer, LBA mapping. The SSD controller also updates the associated LBA, PBA mapping in the OFT. The PBA address may include a Flash channel identifier, a NAND die index, a plane, a block ID, a page number, etc. The PBA address is used to read the user data from Flash media and send the read user data back to the host device.

The SSD controller may also update the PBA column of the OFT during a garbage collection (GC) process. At times, user data stored in the NAND flash media is moved to different physical locations for reasons such as retention, bad block management, recycling, etc. Hence, an SSD controller should update the LBA, PBA mapping if and when such events occur.

Figure 3:
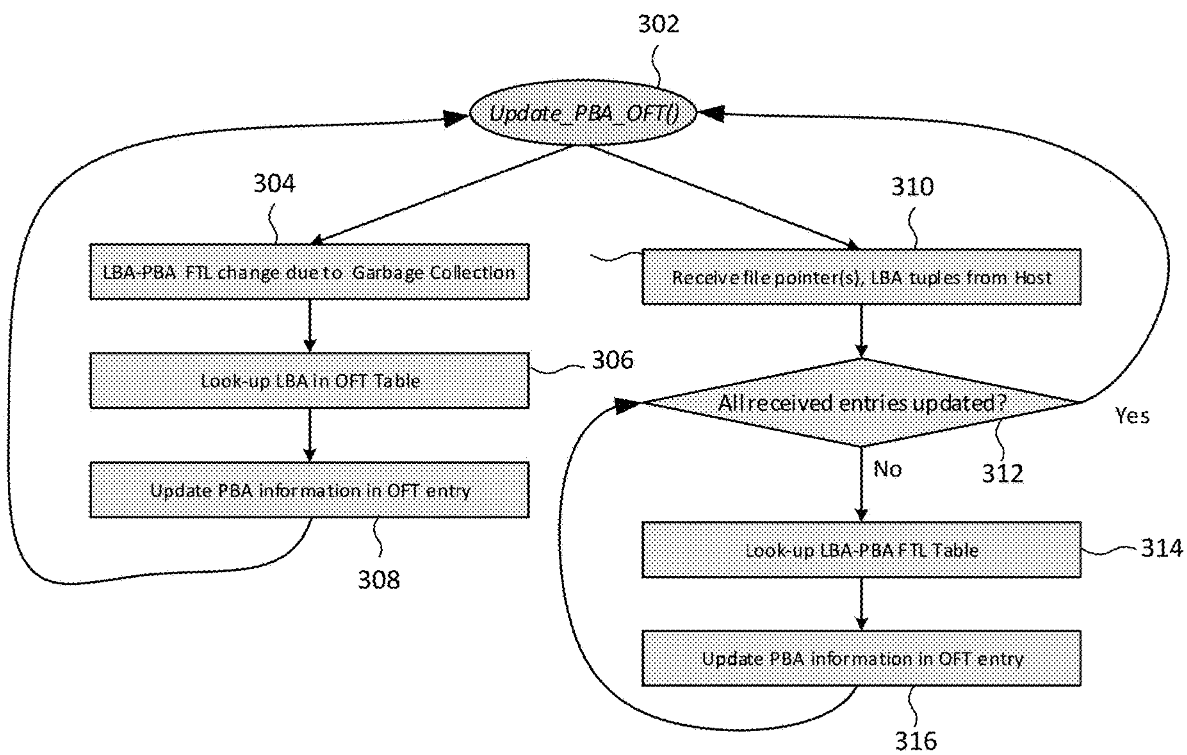
FIG. 3 is a flowchart illustrating an a method for updating a PBA column of an offloaded file table (OFT) at an SSD controller, according to an embodiment.

FIG. 3 is a flowchart illustrating an a method for updating a PBA column of an OFT at an SSD controller, according to an embodiment. Any components or any combination of the components described in FIGS. 6 and 7 can be used to perform one or more of the operations in the flowchart. The operations are exemplary and may involve various additional steps that are not explicitly described. The temporal order of the operations may be varied.

Based on an update_PBA_OFT( ) function call 302, the SSD controller detects a PBA-LBA mapping change due to GC, at 304. The SSD controller retrieves LBA from the OFT, at 306, and updates PBA information in the OFT entry based on an LBA-PBA flash translation layer (FTL) table, at 308, after which the function call returns. Alternatively, in response to the update_PBA_OFT( ) function call 302, the SSD controller receives file pointer(s), LBA tuples from the host device, at 310. At 312, the SSD controller determines whether all received entries are updated. In the case that all received entries are not updated, the SSD controller looks up the LBA-PBA flash translation layer (FTL) table, at 314, and the SSD controller updates PBA information in the OFT entry, at 316. When all received entries are updated, the function call returns.

Accordingly, host software and SSD controller FTL firmware keep the OFT up-to-date so that it can be used by the applications during data read. Applications use a new, optimized file read function call, as shown in Table 3.

Figure 4:
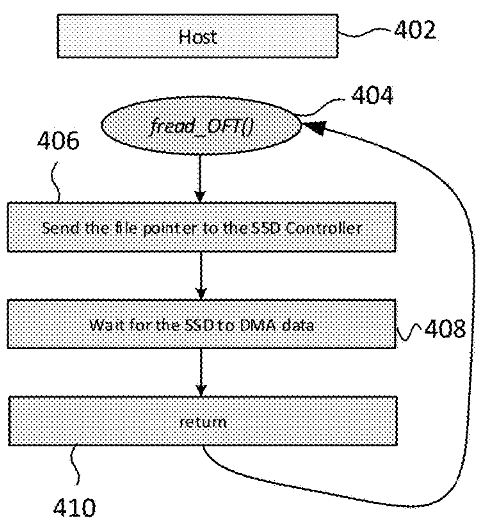
FIG. 4 is a flowchart illustrating an fread_OFT( ) function call at a host device, according to an embodiment.

FIG. 4 is a flowchart illustrating an fread_OFT( ) function call at a host device, according to an embodiment. Any components or any combination of the components described in FIGS. 6 and 7 can be used to perform one or more of the operations in the flowchart. The operations are exemplary and may involve various additional steps that are not explicitly described. The temporal order of the operations may be varied.

An fread_OFT( ) function call 404, of a host device 402, directly communicates with an SSD controller and sends the file pointer, amount of data to read, and optionally, an offset to read from, at 406. The fread_OFT( ) function call may send this information using a vendor defined NVMe command to the SSD controller. This function call then awaits the SSD controller to provide the data via direct memory access (DMA), at 408. At 410, the function returns.

Figure 5:
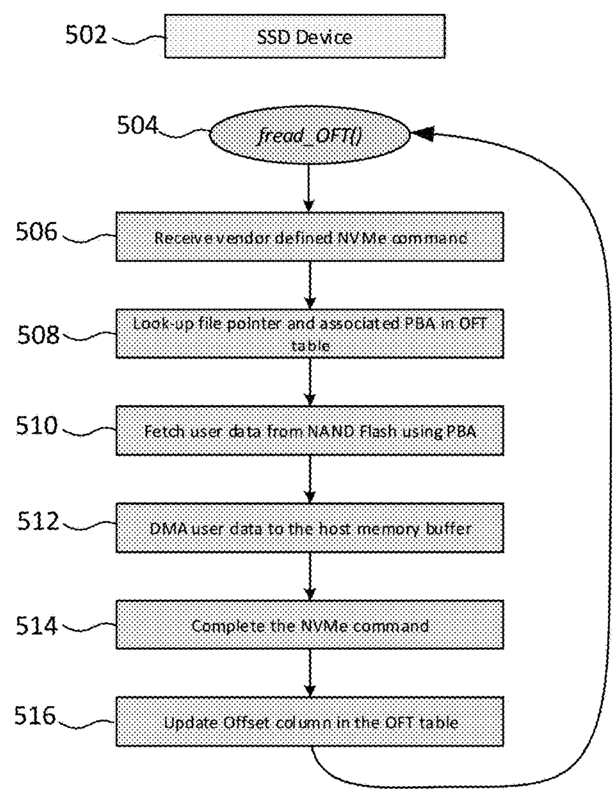
FIG. 5 is a flowchart illustrating an fread_OFT( ) function call at an SSD controller, according to an embodiment.

FIG. 5 is a flowchart illustrating an fread_OFT( ) function call at an SSD controller, according to an embodiment. Any components or any combination of the components described in FIGS. 6 and 7 can be used to perform one or more of the operations in the flowchart. The operations are exemplary and may involve various additional steps that are not explicitly described. The temporal order of the operations may be varied.

An SSD controller 502 receives a vendor defined NVMe command having information provided by an fread_OFT( ) function call 504, at 506. After receiving the command, the SSD controller 502 looks up the file pointer entry in the OFT, and obtains the list of PBAs associated with that file, at 508. The SSD controller 502 then reads the appropriate user data from the NAND flash media using the PBAs, at 510. The SSD controller 502 sends the read user data back to the user application (e.g., host memory buffer) via DMA, at 512, and completes the NVMe command, at 514.

If the command indicates any specific offset read address, the SSD controller uses that while returning the data. If the command does not specify any read offset, the SSD controller may use the offset from the OFT to return the data. After returning the data, the SSD controller may update the new file offset value in the OFT against the file pointer entry, at 516. By default, the OFT entry of an offset is zero when the entry is created.

According to an embodiment, an fwrite_OFT( ) function call can be used to update the file pointer and associated LBAs in an OFT when data is written to a file. Although the file write operations may not be in the read latency critical path, some use cases and applications may benefit from updating the OFT after data write. Alternatively, other data write related file system calls, such as fflush( ) and fsync( ), can be supported with similar systems and methods.

Host software may use another function call, such as fseek_OFT( ), to reset or change the read offset value in the OFT. When the SSD controller receives a new offset value for a given file pointer from the host device, it may update the corresponding OFT entry. Once the OFT entry is updated, the new offset value may be used for subsequent user data read operations for that file.

An fclose_OFT( ) function call may reset the offset entry when a file is closed. It may also instruct (or request) the SSD controller to remove the file pointer entry from the OFT. An SSD controller that receives the request from host software, may update the OFT as requested.

Figure 6:
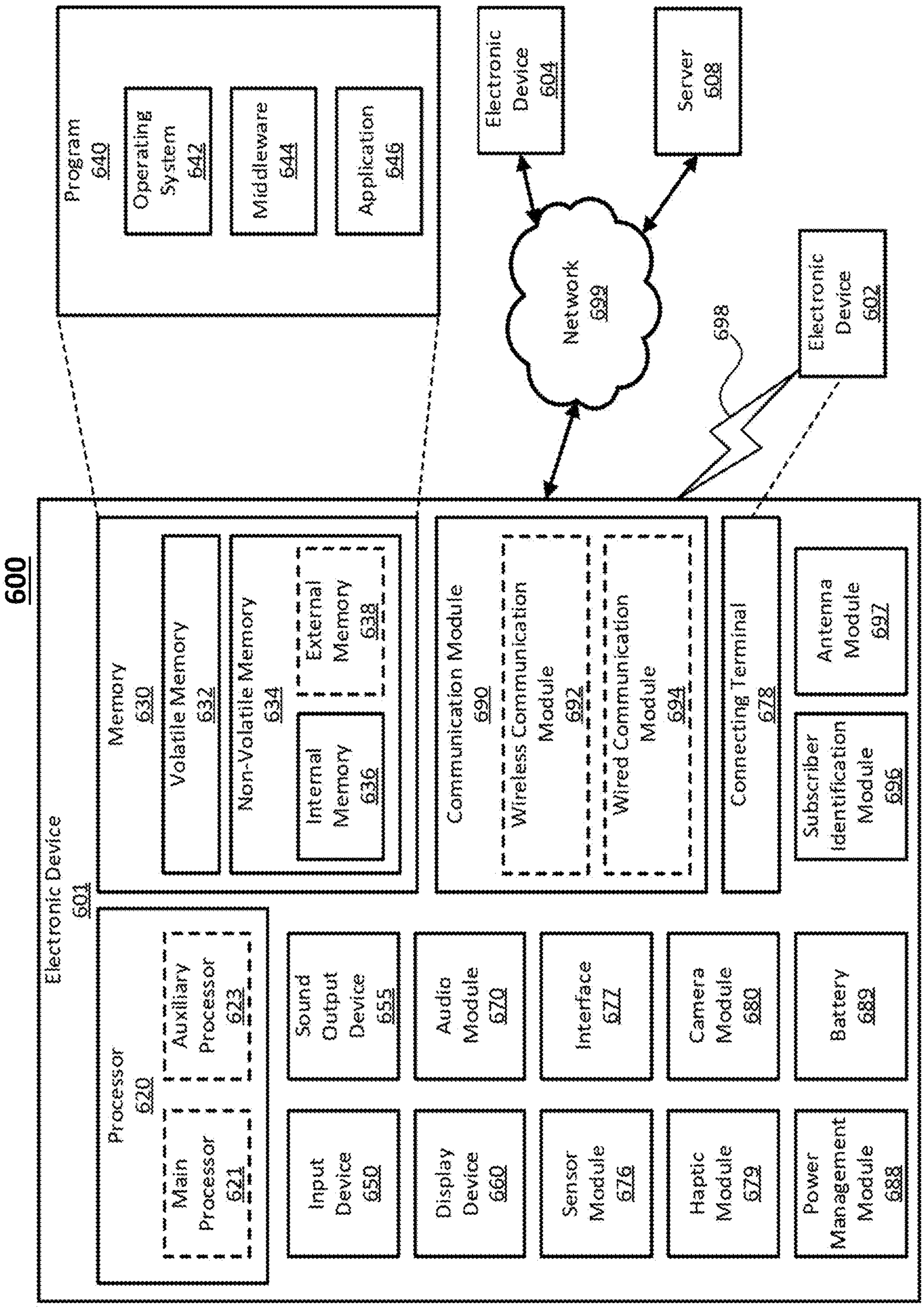
FIG. 6 is a block diagram illustrating an electronic device in a network environment, according to an embodiment.

FIG. 6 illustrates a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a CPU or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 7:
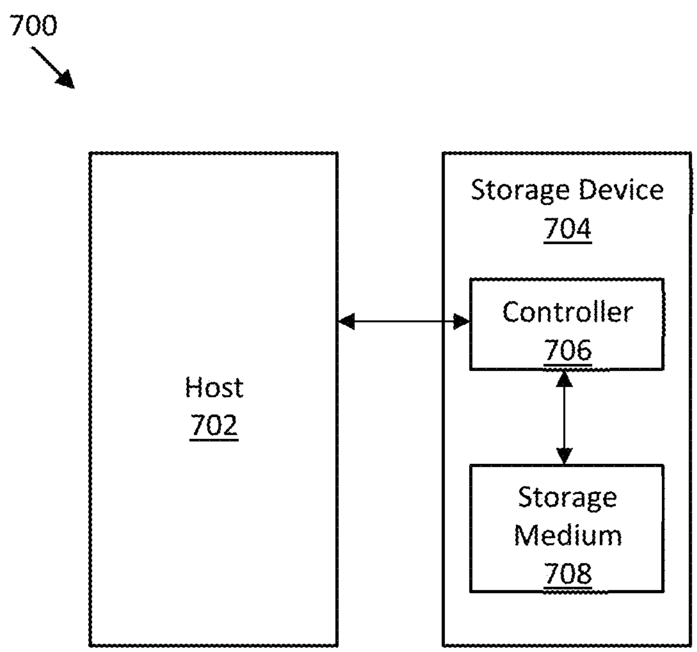
FIG. 7 is a diagram illustrating a storage system, according to an embodiment.

FIG. 7 illustrates a diagram of a storage system 700, according to an embodiment. The storage system 700 includes a host 702 and a storage device 704. Although one host and one storage device is depicted, the storage system 700 may include multiple hosts and/or multiple storage devices. The storage device 704 may be a solid state device (SSD), a universal flash storage (UFS), etc. The storage device 704 includes a controller 706 and a storage medium 708 connected to the controller 706. The controller 706 may be an SSD controller, a UFS controller, etc. The storage medium 708 may include a volatile memory, a non-volatile memory, or both, and may include one or more flash memory chips (or other storage media). The controller 706 may include one or more processors, one or more error correction circuits, one or more field programmable gate arrays (FPGAs), one or more host interfaces, one or more flash bus interfaces, etc., or a combination thereof. The controller 706 may be configured to facilitate transfer of data/commands between the host 702 and the storage medium 708. The host 702 sends data/commands to the storage device 704 to be received by the controller 706 and processed in conjunction with the storage medium 708. As described herein, the methods, processes and algorithms may be implemented on a storage device controller, such as controller 706. The arbiters, command fetchers, and command processors may be implemented in the controller 706 of the storage device 704, and the processors and buffers may be implemented in the host 702.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a storage device, comprising:

receiving, from an application at a host device, at a controller of the storage device, a read command generated using an application programming interface (API), the read command comprising at least a file pointer of a file, an amount of file data to be read from the memory and a file read offset;

retrieving, at the controller, a physical block address (PBA) list associated with the file data from a table maintained at the controller using the file pointer;

reading, by the controller, the file data from a memory using the PBA list, and providing the file data, from the controller, to the application at the host device;

receiving, by the controller, a logical block address (LBA) list for entries of the table stored at the controller, from the host device;

determining, by the controller, a first entry of the table from the LBA list that is in a first state and a second entry of the table from the LBA list that is in a second state; and modifying, by the controller, the second entry of the table with corresponding PBA list information retrieved from a flash translation layer (FTL) table.

2. The method of claim 1, wherein the read command comprises a non-volatile memory express (NVMe) command.

3. The method of claim 1, wherein the table comprises an offloaded file table (OFT) that comprises at least one of a file pointer column, an LBA list column, a PBA list column, and a file read offset column.

4. The method of claim 3, wherein the file data is provided to the application using the file read offset column.

5. The method of claim 1, wherein the file data is provided to the application using the file read offset of the command, and the file read offset column is updated using the file read offset of the command.

6. The method of claim 3, wherein receiving the LBA list comprises receiving, from the host device, at the controller, an updated file pointer-LBA list mapping for the second entry of the OFT, and further comprising:

retrieving, by the controller, the PBA list information from the FTL table based on the updated mapping.

7. The method of claim 3, further comprising:

detecting, by the controller, a change in a PBA-LBA mapping in an entry of the OFT due to a garbage collection process;

retrieving LBA list information from the entry of the OFT;

retrieving, by the controller, PBA list information from the FTL table based on the retrieved LBA list information; and updating, by the controller, the entry of the OFT with the retrieved PBA list information.

8. A storage device, comprising:

a controller; and a storage medium, wherein the controller is configured to:

receive, from an application at a host device, a read command generated using an application programming interface (API), the read command comprising at least a file pointer of a file, an amount of file data to be read from the storage medium and a file read offset;

retrieve a physical block address (PBA) list associated with the file data from a table maintained at the controller using the file pointer;

read the file data from the storage medium using the PBA list, and provide the data to the application at the host device;

receive a logical block address (LBA) list for entries of the table stored at the controller, from the host device;

determine, by the controller, a first entry of the table from the LBA list that is in a first state and a second entry of the table from the LBA list that is in a second state; and modify the second entry of the table with corresponding PBA list information retrieved from a flash translation layer (FTL) table.

9. The storage device of claim 8, wherein the read command is a non-volatile memory express (NVMe) command.

10. The storage device of claim 8, wherein the table is an offloaded file table (OFT) that comprises at least one of a file pointer column, an LBA list column, a PBA list column, and a file read offset column.

11. The storage device of claim 10, wherein the file data is provided to the application using the file read offset column.

12. The storage device of claim 10, wherein the file data is provided to the application using the file read offset of the command, and the file read offset column is updated using the file read offset of the command.

13. The storage device of claim 10, wherein:

in receiving the LBA list, the controller is further configured to:

receive, from the host device, an updated file pointer-LBA list mapping for the second entry of the OFT; and the controller is further configured to:

retrieve the PBA list information from the FTL table based on the updated mapping.

14. The storage device of claim 10, further comprising:

detect a change in a PBA-LBA mapping in an entry of the OFT due to a garbage collection process;

retrieve LBA list information from the entry of the OFT;

retrieve PBA list information from the FTL table based on the retrieved LBA list information; and update the entry of the OFT with the retrieved PBA list information.

15. A method of a host device, comprising:

sending, from an application at the host device, to a controller of a storage device, a read command generated using an application programming interface (API), the read command comprising at least a file pointer of a file comprising file data for the application, an amount of file data to be read and a file read offset; and receiving, from the controller, at the application, the file data retrieved by the controller using a table maintained at the controller that associates file pointers with physical block address (PBA) lists for file data and using the file read offset to determine a portion of the file data to return; and sending, from the host device to the controller, a logical block address (LBA) list for entries of the table to the controller to determine a first entry of the table from the LBA list that is in a first state and a second entry of the table from the LBA list that is in a second state, and to modify the second entry with corresponding PBA list information retrieved from a flash translation layer (FTL) table.

16. The method of claim 15, wherein the read command is a non-volatile memory express (NVMe) command.

17. The method of claim 15, wherein the table is an offloaded file table (OFT) that comprises a file pointer column, an LBA list column, a PBA list column, and a file read offset column.

18. The method of claim 17, wherein sending the LBA list comprises:

obtaining a given file pointer of a given file; and obtaining the LBA list corresponding to the given file pointer using a file system and a storage block layer; and sending a mapping of the given file pointer and the LBA list to the controller to update the second entry of the OFT at the controller.

* * * * *